United States Patent
Da Costa Cristóvão Caiado et al.

(10) Patent No.: US 11,334,930 B2
(45) Date of Patent: May 17, 2022

(54) DIGITAL METHOD FOR PURCHASE CENTRALISATION, OPTIMISATION AND NEGOTIATION

(71) Applicant: GSBS CONSULTING LDA., Porto Salvo (PT)

(72) Inventors: Aníbal Jorge Da Costa Cristóvão Caiado, Barcarena (PT); Júlio Miguel Da Silva Ribeiro, Carcavelos (PT)

(73) Assignee: GSBS CONSULTING LDA., Porto Salvo (PT)

( * ) Notice: Subject to any disclaimer, the term of this patent is extended or adjusted under 35 U.S.C. 154(b) by 26 days.

(21) Appl. No.: 16/612,117

(22) PCT Filed: May 17, 2018

(86) PCT No.: PCT/PT2018/050018
§ 371 (c)(1),
(2) Date: Nov. 8, 2019

(87) PCT Pub. No.: WO2018/217115
PCT Pub. Date: Nov. 29, 2018

(65) Prior Publication Data
US 2020/0118183 A1    Apr. 16, 2020

(30) Foreign Application Priority Data
May 24, 2017    (PT) .......................... 110095

(51) Int. Cl.
*G06Q 30/00*    (2012.01)
*G06Q 30/06*    (2012.01)
(Continued)

(52) U.S. Cl.
CPC ....... *G06Q 30/0601* (2013.01); *G06Q 10/087* (2013.01); *G06Q 20/10* (2013.01);
(Continued)

(58) Field of Classification Search
CPC ..... G06Q 30/0601–0645; G06Q 30/08; G06Q 10/087; G06Q 20/10; G06Q 20/20;
(Continued)

(56) References Cited

U.S. PATENT DOCUMENTS 7,536,362 B2 * 5/2009 Starr .................. G06Q 30/0283
705/400
7,865,399 B2 * 1/2011 Crespo .................. G06Q 20/04
705/26.41
(Continued)

FOREIGN PATENT DOCUMENTS

KR    20170092037 A  *  8/2017
KR    101908911 B1  * 10/2018

OTHER PUBLICATIONS

Lunka, Ryan. "Distributed Order Management as a Competitive Advantage." NChannel, Inc., Jul. 30, 2015, www.nchannel.com/blog/distributed-order-management-competitive-advantage.*

*Primary Examiner* — Kathleen Palavecino
(74) *Attorney, Agent, or Firm* — The Roy Gross Law Firm, LLC; Roy Gross

(57) ABSTRACT

The present invention refers to a digital method of centralizing, optimizing and negotiating the purchase of goods and services implemented by computer, wherein at least one authorised user (101) by the company or purchase centre (108), identifies the products (102) to be acquired and proceeds to consult with at least one potential supplier (103) through a digital purchase platform (109), hosted in a dedicated server, locally or in a cloud. The company or purchase centre (109) proceeds to validate the proposals (104) from the suppliers (103), and can create different, economically more advantageous choice scenarios from the proposals (104) that satisfy all the restrictions imposed by the company or purchase centre (109) and by the suppliers (103).

3 Claims, 10 Drawing Sheets

(51) Int. Cl.
*G06Q 10/08* (2012.01)
*G06Q 20/10* (2012.01)
*G06Q 20/20* (2012.01)
*G06Q 20/40* (2012.01)
*G06Q 30/02* (2012.01)
*G06Q 40/04* (2012.01)
*G06Q 50/18* (2012.01)

(52) U.S. Cl.
CPC ............. *G06Q 20/20* (2013.01); *G06Q 20/40* (2013.01); *G06Q 30/02* (2013.01); *G06Q 40/04* (2013.01); *G06Q 50/188* (2013.01)

(58) Field of Classification Search
CPC ........ G06Q 20/40; G06Q 30/02; G06Q 40/04; G06Q 50/188
USPC ................................................ 705/26.1–27.2
See application file for complete search history.

(56) References Cited

U.S. PATENT DOCUMENTS

| | | | |
|---|---|---|---|
| 9,070,166 B2* | 6/2015 | Bennett | G06Q 30/0255 |
| 2002/0169658 A1* | 11/2002 | Adler | G06Q 30/0205 |
| | | | 705/7.28 |
| 2003/0110089 A1* | 6/2003 | Villani | G06Q 10/0637 |
| | | | 705/7.36 |
| 2007/0226082 A1* | 9/2007 | Leal | G06Q 30/0643 |
| | | | 705/14.71 |
| 2012/0005101 A1* | 1/2012 | Chessick | G06Q 30/0605 |
| | | | 705/80 |
| 2013/0117148 A1* | 5/2013 | Koch | G06Q 30/08 |
| | | | 705/26.7 |
| 2015/0120482 A1* | 4/2015 | Kourpas | G06Q 30/0619 |
| | | | 705/26.2 |
| 2016/0055448 A1* | 2/2016 | Ellis | G06Q 10/087 |
| | | | 705/28 |

* cited by examiner

DIGITAL METHOD FOR PURCHASE CENTRALISATION, OPTIMISATION AND NEGOTIATION

RELATED APPLICATIONS

This application is a National Phase of PCT Patent Application No. PCT/PT2018/050018 having International filing date of May 17, 2018, which claims the benefit of priority of Portugal Application No. 110095 filed on May 24, 2017. The contents of the above applications are all incorporated by reference as if fully set forth herein in their entirety.

FIELD OF THE INVENTION

The present invention consists of a process of centralising, optimizing and negotiating purchases of goods and services implemented by computer.

STATE OF THE ART

Today there are some purchasing and e-commerce platforms that virtually connect (through the internet and cloud computing) one or more buyers to one or more sellers to carry out transactions of goods and services between consumers, commonly referred to as Consumer-To-Consumer (C2C), between companies and consumers, commonly referred to as Business-To-Consumer (B2C), and between companies commonly referred to as Business-To-Business (B2B).

Patent application no. US 20070226082 A1, published on Sep. 27, 2007, refers to an e-commerce system between companies and consumers (B2C) wherein the potential buyers present their purchase intentions by way of a virtual communication network that the sellers use to generate their customised offers.

Patent application no. US 20160055448 A1, published on Feb. 25, 2016, refers to a digital system of centralizing information on products commercialised by manufacturers, distributors and/or representatives for use by accredited users (retail stores, outlets and specialist companies).

U.S. Pat. No. 9,070,166 B2, published on Jun. 30, 2015, is characterized by a sales portal on the internet of multiple products characterized by a system that monitors information on transactions and sales opportunities between buyers (consumers or companies) and sellers.

U.S. Pat. No. 7,865,399 B2, published on Jan. 4, 2011, refers to an e-commerce system that enables buyers to purchase articles from the sellers through a broker who monitors the purchasing procedure from the identification of the article, through to the presentation of the conditions to the buyer, and on to dispatch.

In the case of purchases and e-commerce between companies (B2B), most processes used involve the purchase of one (or more) product(s) from the seller who offers the respective lowest unit price and, in some cases, satisfies the purchaser's requirements (for example, the quality of the product, the delivery term, the service, among others).

None of the applications and patents cited previously describe the technical characteristics claimed in the present invention, specifically in relation to the process of e-purchases between companies (B2B) wherein the purchaser can mathematically optimize the negotiation and purchasing of multiple products (for example, by minimizing the total acquisition cost), subject to restrictions imposed by the purchasers and/or suppliers such as minimum quantities to be supplied, commercial discounts and other valuation premiums of the products and/or suppliers.

The state of the art (specifically the domestic or international markets) does not comprise any process, method or digital system of corporate purchases, based on a mathematical optimization model, that is capable of determining the optimal purchase—one that minimizes the total acquisition cost of multiple goods and services—in view of the extensive constraints imposed by the purchaser and by the supplier. These constraints relate to price, quantities and supplier rating, including incremental quantity discounts and staggered discounts on total purchase value, financial discounts and other valuation premiums or exclusion of particular products and/or suppliers of the contracted deal.

For example, in a consultation with multiple suppliers, it may be advantageous for the purchaser to acquire a given product from two or more suppliers in different quantities or to purchase two or more products from a sole supplier, benefiting from incremental quantity discounts or staggered discounts on total purchase value (potentially, after negotiation), rather than purchase the quantities required of a given product from just one supplier alone or of just one product from a given supplier), provided that the optimal combination of the quantities to be acquired of the multiple products from the multiple suppliers satisfies the supplier's commercial and financial requirements and the best interests of the purchaser at the lowest possible acquisition cost.

In light of the above, there is a gap in the market of e-purchases between companies (B2B) that enables a purchaser to centralise, negotiate and optimize the purchase of products from multiple suppliers so as to satisfy the functional constraints described above.

SUMMARY OF THE INVENTION

The invention consists of a process or method of centralising, negotiating, optimizing and monitoring purchases of goods and services implemented by computer, wherein at least one authorised user of a company or purchase centre identifies the products to be acquired and proceeds to consult at least one potential supplier by way of the digital purchase platform, hosted in a dedicated server, locally or in a cloud.

Interested suppliers must fill out an array of prices, quantities and any staggered discounts per quantity or per overall volume of the contracted deal and other commercial or financial discounts, which will be validated by the company or purchase centre through the digital purchase platform.

In this process, the company or purchase centre may reject any of the suppliers or part of the products included in its supply proposal and/or fix minimum percentages to be acquired of the proposed quantities of these products before determining the optimal procurement solution, that is, the one that minimizes the total acquisition cost subject to the various restrictions either by the purchaser or by the seller/supplier.

The optimal solution is obtained by applying a linear optimization algorithm which uses approximations of linear parts of mixed integer programming functions with continuous and integer variables subject to a considerable number of constraints. This quickly determines the optimal mix of multiple product quantities to contract with multiple suppliers to minimize the total purchase cost.

A negotiation phase follows, wherein the suppliers are invited to improve their initial proposals in terms of unit prices, commercial discounts by quantity or by purchase value (if desired, in discount tiers), financial discounts and, potentially, presenting prices for other (new or alternative) articles over the digital platform.

This e-negotiation process may be repeated as many times as necessary in the best defence of the purchaser's interests.

Lastly, the company or purchase centre proceeds to validate the reviewed proposals from the suppliers, and may create different economically most advantageous choice scenarios of the proposal that satisfy all the restrictions imposed by the purchaser and by the suppliers.

The company or purchase centre may also adopt an optimal selection procedure of the best supply proposals according to qualitative and quantitative evaluation criteria (scores) of the suppliers besides price and any potential commercial and financial discount premiums.

All these procedures are controlled by a user authorised by the company or purchase centre and monitored by way of an integrated process of importing data, processing, negotiation, optimizing and exporting the results to web or mobile consultations.

BRIEF DESCRIPTION OF THE DRAWINGS

The following description is made with reference to the accompanying drawings that are presented solely as references, not being limitative in character, wherein.

KEY TO THE REFERENCE NUMBERS

Figure 1:
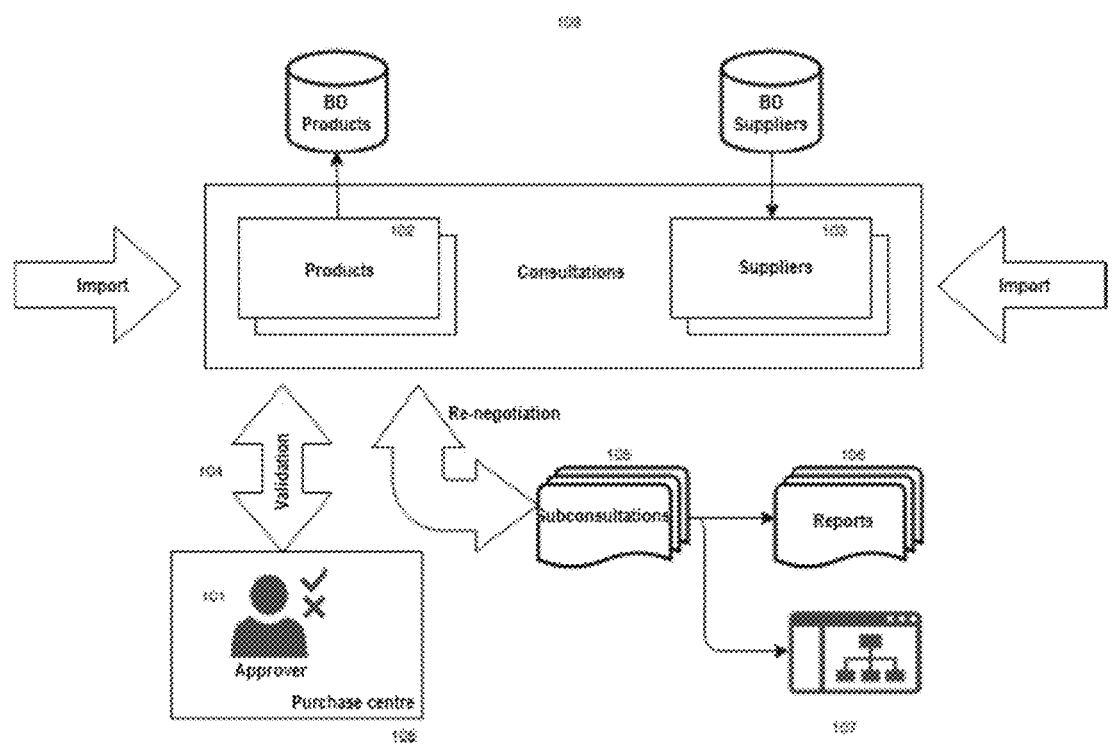
FIG. 1 is a diagram of the digital purchase platform that enables the centralisation, negotiation, optimizing and monitoring of procedures for purchasing services and multiple products from multiple suppliers.

Authorised User (101)
Products (102)
Supplier (103)
Proposal (104)
Subconsultations (105)
Tables (106)
Graphics (107)
Company or purchase centre (108)
Digital purchase platform (109)
Users (201)
Suppliers (202)
Solution (2013)
PC/Mac (204)
Tablet (205)
Smartphone (206)
Key word (301)
User (302)
Homepage (303)
Login (304)
Create user (401)
Delete user (402)
Search user (403)
Create group (404)
Delete group (405)
Search group (406)
New consultation (501)
Export consultation (502)
Search consultation (503)
Edit consultation (507)
Delete consultation (504)
Use active consultation (505)
Create active subconsultation (506)
Create product (601)
Delete product (602)
Edit product (609)
Search product (603)
Add product to the consultation (604)
Withdraw product from the consultation (605)
Alter required quantity (606)
Export products (607)
Import products (608)
Create supplier (701)
Delete supplier (702)
Edit supplier (708)
Search supplier (703)
Add supplier to the consultation (704)
Withdraw supplier from the consultation (705)
Export suppliers (706)
Import suppliers (707)
Inclusion of best prices by the supplier (801)
Supply proposals (805)
Inclusion of approved values in the database (802)
Rejection of values (803)
Define conditions (804)
Restrictions on purchasers and suppliers (901)
Prices (902)
Required and proposed quantities (903)
Staggered discounts per quantity (904)
Staggered discount per overall business volume (905)
Financial discounts (906)
Exclusion/valuation of products and/or suppliers (908)
Other qualitative evaluation criteria of suppliers (909)
Selection of suppliers (910)
Optimal solution (911)
Products and quantities to be acquired (912)
List of suppliers (913)
Qualitative evaluation of the suppliers (914)
Detailed information (1001)
Table of the total procurement cost (1002)
Table of the optimal quantities to be acquired per product (1003)
Table of the best prices proposed per product (1004)
Table of the products and optimal quantities per supplier (1005)
Table of the summary of the optimal purchase per consultation (1006)

Table of the comparison of subconsultations (1007)
Graphics of the comparison of consultations (1008)
Reports exported to Excel (1009) format

DETAILED DESCRIPTION OF THE INVENTION

Next, there is a detailed description of the invention with reference to the diagrams presented in FIGS. 1 to 10.

FIG. 1 is a diagram of the digital purchase platform that enables the centralisation, negotiation, optimizing and monitoring of procedures of purchasing services and multiple products from multiple suppliers (103), wherein at least a user (101) authorised by a company or purchase centre (108) identifies the products (102) and the quantities to be acquired in accordance with their needs and proceeds to consult at least a supplier (103) interested in proceeding to provide its supply by way of a digital purchase platform.

Interested suppliers (103) present their supply proposals by satisfying two components of the digital purchase platform (109), introducing for such the access credentials provided by the user (101) authorised by the company or purchase centre (108).

In the first component, interested suppliers (103) must fill out an array of prices, which must contain the best proposal (104) for each product (102) in terms of unit price the proposed maximum quantity to be supplied and any staggered discounts for specific quantities.

In the second component, should they so wish, the suppliers (103) may present any incremental discounts based on total purchase value as well as financial discounts.

The company or purchase centre (108), should it so wish and automatically, may proceed, automatically and without prior notice, to reject the supply proposal (104) of any of the suppliers (103) or of part of the products (102) included in the proposal of any of the suppliers (103) and to value one or more products included in the proposal (102) of any of the suppliers (103) fixing a minimum percentage to be acquired of the proposed quantities of these products (102) by the respective suppliers (103).

The company or purchase centre (108), should it so wish and automatically and also without prior notice, may establish an initial or preliminary ranking of suppliers (103) for each of the products (102) included in their supply proposals (104) based on supplier evaluation criteria (103) such as price, quality, delivery, technical assistance, financial stability, geographical location, among others.

These evaluation criteria of suppliers (103) may be pondered in the optimal purchase decision, partially or totally relaxing the function of the economically most advantageous proposal (104) in favour of other (quantitative or qualitative) factors that best satisfy the interests of the company or purchase centre (108).

A negotiation phase follows in which the company or purchase centre (108), after learning the optimal combination of multiple products (102) to be contracted with multiple suppliers (103) of the initial consultation on the proposal (104), may create one or more subconsultations (105) over the digital purchase platform (109), inviting the suppliers (103) to improve their initial proposals (103) in terms of unit prices, staggered commercial discounts on quantity or purchase value and financial discounts, in cases where they have not done so in their initial proposal (104) or want to improve the conditions where they did not, and also to present prices for other products (102), which may be new products (102) or alternative products (102).

After concluding the negotiation phase, the company or purchase centre (108) proceeds to validate the reviewed proposals (104) from the suppliers (103), and may create, should it so wish, different scenarios for optimal choice of the best proposal (104) for the supply of products (102), based on the acquisition cost and the restrictions imposed for the best defence of its interests such as the valuation of products (104) and suppliers (103).

Obtaining the optimal solution for each of the scenarios or (sub)consultations of proposals (104) is the automatic result of applying a linear optimization algorithm which uses approximations of linear parts of mixed integer programming functions with continuous and integer variables subject to a considerable number of constraints, to determine the optimal combination of quantities of multiple products (102) to contract out to multiple suppliers, while adhering to buyer and supplier constraints, so as to minimize the total acquisition cost of products (102).

The method described in the present invention provides detailed information on each of the different purchase scenarios through tables (106) and dynamic graphics (107) (in real time) of optimal quantities to contract out for each product (103), best prices proposed for each product, product discounts, total purchase value discounts and financial discounts and for each supplier, initial costs, optimal costs, savings obtained in each subconsultation of proposals (104) and the breakdown thereof into commercial and financial discounts.

The process of centralising, optimizing and monitoring purchases will now be described in detail for each of the components of the invention:

1) Digital Purchase Platform

The digital purchase platform (109) for optimizing and negotiating purchases of goods and services between companies (B2B), described previously, is hosted in a dedicated server, locally or in a cloud, and is used to carry out the digital method of centralising, optimizing and negotiating purchases of goods and services between companies (B2B), implemented by computer.

The digital purchase platform (109) comprises the following functions:

Consulting one or more suppliers (103) potentially interested in furnishing one or more products (102) to be acquired by a company or purchase centre (108) of products (102);

Receiving from the interested suppliers (103) the proposals (104) to furnish products (102);

Validating by the company or purchase centre (108) the conditions proposed by said suppliers (103) of products (102);

Determining, in real time, the optimal combination of quantities of the multiple products (102) to contract out to multiple suppliers (103) of products (102);

Creating one or more negotiation subconsultations with the suppliers (103) of products (102);

Validating the reviewed proposals (104) from the suppliers (103), contained in said subconsultations to the suppliers (103) of products (102);

Process tables (106) of reports in real time with detailed information on each of the different scenarios of purchase of products (102); and Contract out the proposals (104) to a supplier (103) or the respective suppliers (103) that best defend the interests of the company or purchase centre (108) of products (102).

2) Communication Channel

Figure 2:
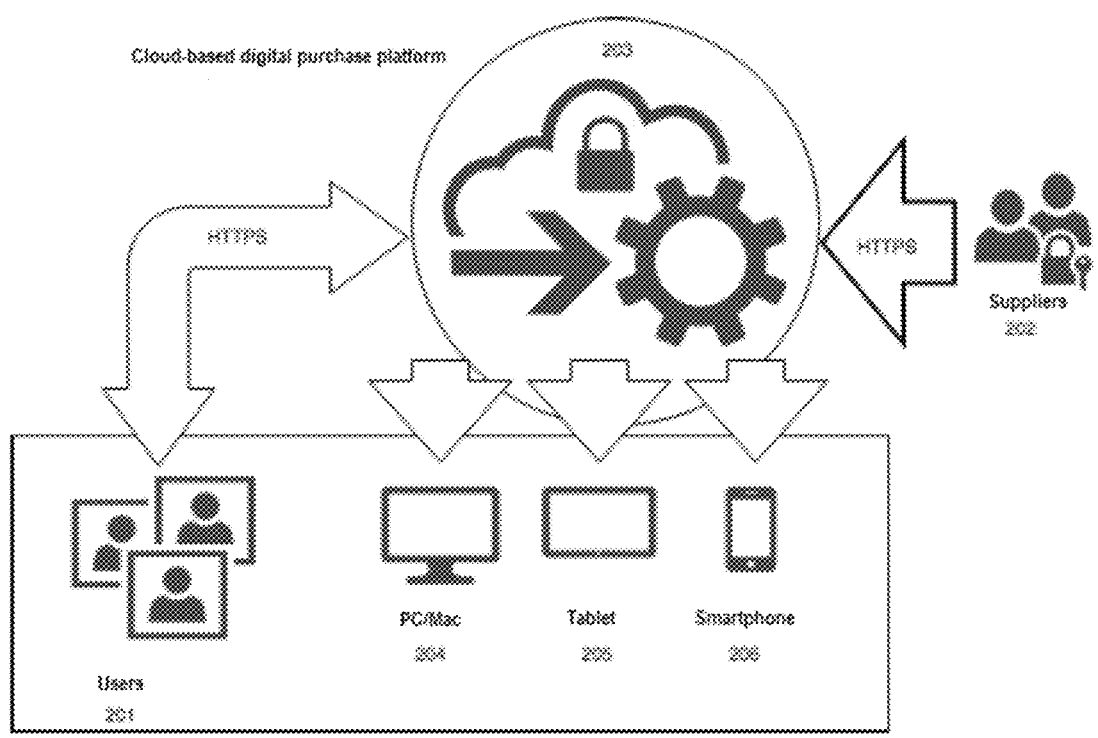
FIG. 2 is a detailed diagram of the communication process flow.

FIG. 2 is a detailed communication flow diagram of the solution (203).

The users (201) and suppliers (202) access the platform using a secure link under the protocol HTTPS with digital certificate so as to create a secure link. The platform is hosted in the cloud, in a server on the internet with access protected by username (201) and password.

The layout of the information is responsive, and is automatically adjusted in accordance with the type of client who is accessing, be it PC/MAC (204), tablet (205) or smartphone (206) always guaranteeing perfect visualization.

3) Login

Figure 3:
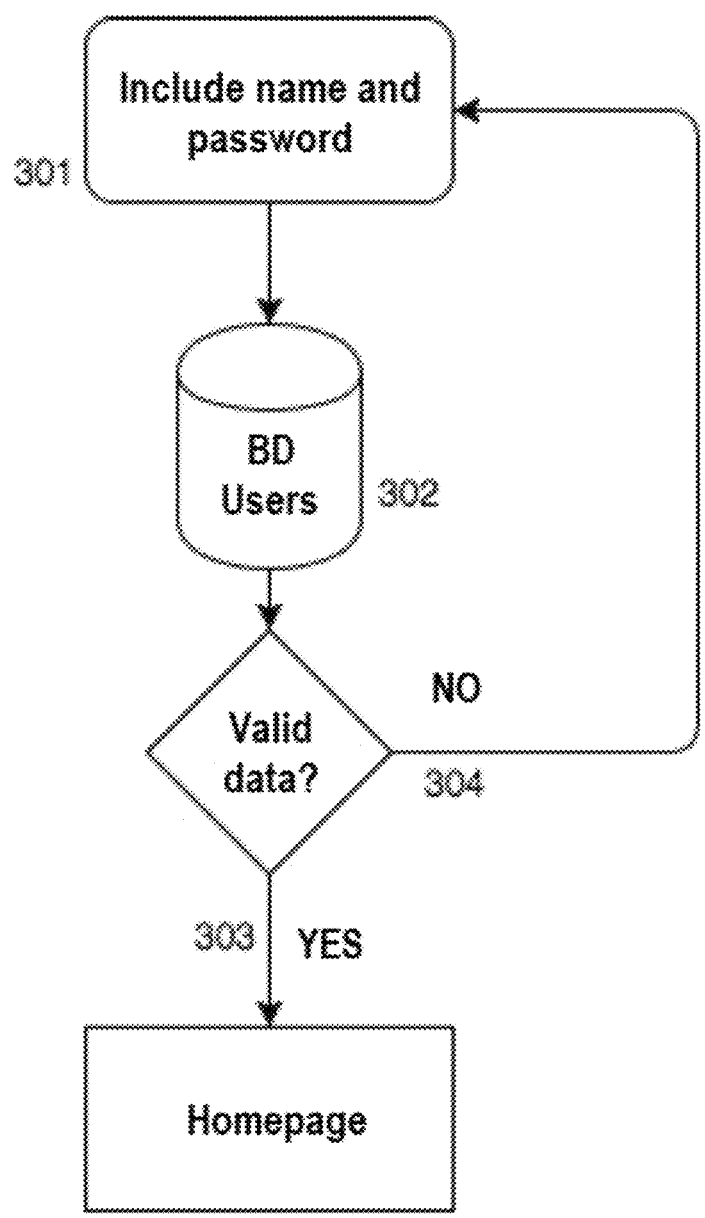
FIG. 3 is a detailed diagram of the authentication process for accessing the digital platform.

FIG. 3 is a detailed diagram of the authentication process of the administrator or of users (302) of the database in accessing the digital platform.

The authorised administrator or user (302) should introduce a username and a password (301) to gain access to the application.

These access data are stored in the database when the user (302) is created by the authorised administrator or user.

The access data of the administrator are created when the company is created.

The access data of the administrator or user (302) introduced are compared with those existing in the table of users of the database (302), and if identical the user gains access to the homepage (303), otherwise he/she returns to the login (304).

4) Users

Figure 4:
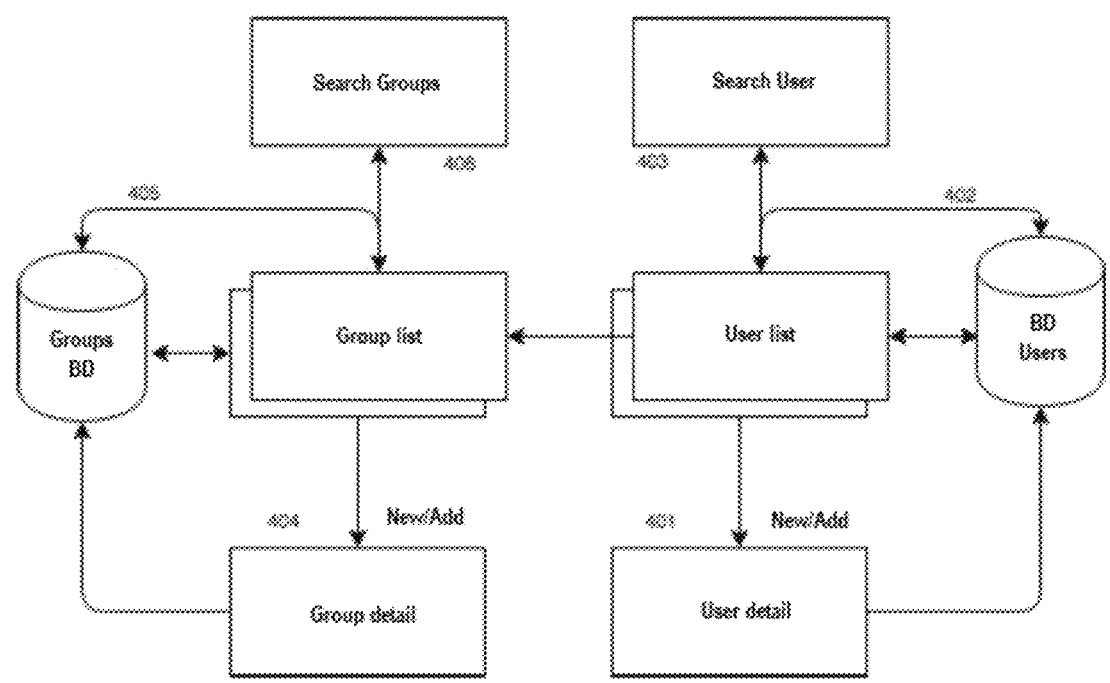
FIG. 4 is a detailed diagram of the process of creation, editing and importing of platform users.

FIG. 4 is a detailed diagram of the process of creating, editing and importing users (401) from the platform.

In this option, the user (401) can create/delete or edit users (401) and groups with the following functionalities:

2.1) Create user (401)—With this functionality the user (401) can create new users (401) for its company by including the name, the e-mail, the username for login, the password, group he/she belongs to, telephone, city and country. Additionally, for each option of application, it is possible to define whether the user (401) has access thereto and if so, whether said user may alter or merely consult data. The language used in the application for each of the users (401) can also be defined.

2.2) Delete user (402)—With this functionality the user can delete users if he/she has permission to do so (402).

2.3) Edit user (401)—Enables the data of a given user (401) to be altered.

2.4) Search user (403)—It is possible to look for a given user (401) by introducing the search text in the field "Search user" (403).

2.5) Create group—With this functionality the user (401) can create new groups for its company by inserting the name of the group and optionally a description (404).

2.6) Delete group—With this functionality the user can delete groups (405).

2.7) Edit group—Allows the name of the group (404) to be altered.

2.8) Search group (406)—It is possible to look for a given group by introducing the search text in the field "Search group" (406).

5) Consultations

Figure 5:
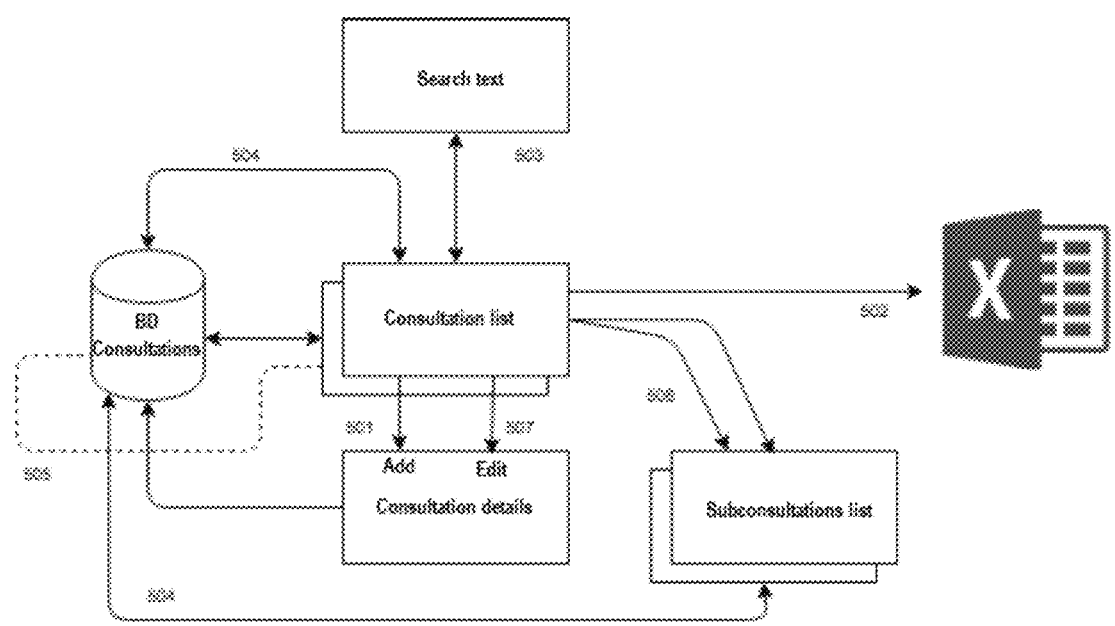
FIG. 5 is a detailed diagram of the creation of consultations and subconsultations.

FIG. 5 is a detailed diagram of the creation of consultations and subconsultations.

The user may create, delete or edit consultations and subconsultations with the following functionalities:

3.1) New consultation (501)—The user may create new consultations for its company by inserting data, group, name of the consultation and remarks. The user may also close a given consultation (501), if he/she so wishes, meaning no further supplier can access the same consultation (501).

3.2) Export consultation (502)—Enables the data from existing consultations to be exported to the user's company in Microsoft Excel (xlsx) format (502).

3.3) Search consultation (503)—It is possible to look for a given consultation by introducing the search text in the field "Search" (503).

3.4) Edit consultation (507)—Enables the data of a given consultation (507) to be altered.

3.5) Delete consultation (504)—The user may delete consultations provided that there are no associated subconsultations and that he/she has permission to do so (504).

3.6) Use consultation—The user may activate the desired consultation. Once active, all operations of the application will be carried out in this same consultation (505).

3.7) Create subconsultation—The user may create a subconsultation from the active consultation, all the products, prices and suppliers thereof being imported to the new one (506).

6) Products

Figure 6:
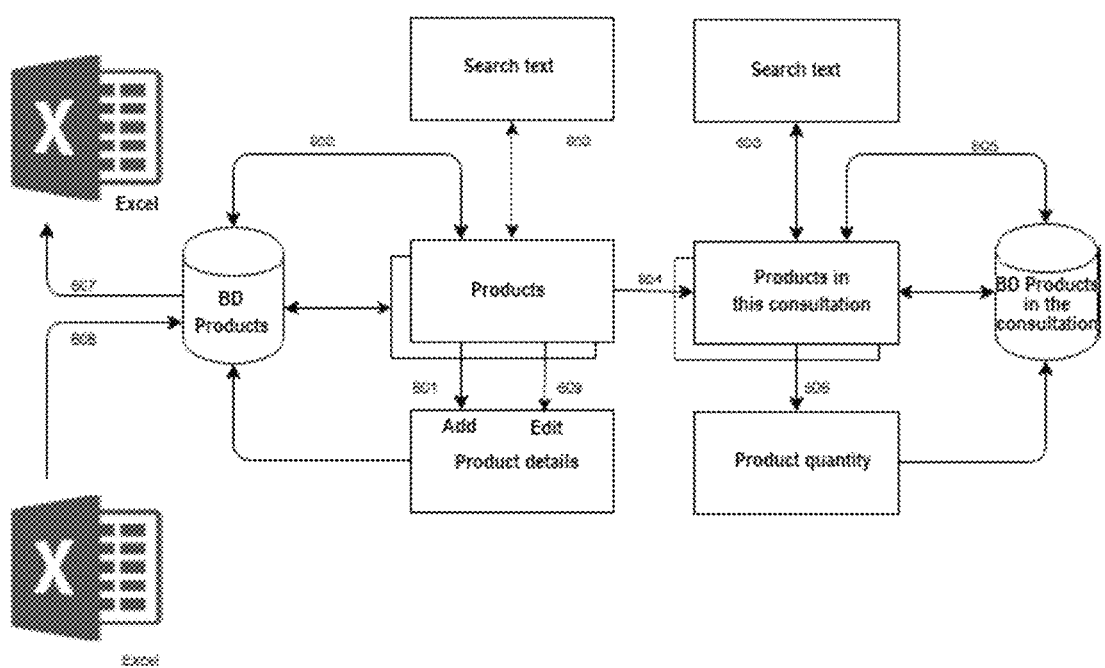
FIG. 6 is a detailed diagram of creating, editing and importing products and including them in a given consultation.

FIG. 6 is a detailed diagram of creating, editing and importing products and inclusion thereof in a given consultation. This option has the following functionalities:

4.1) Create product (601)—The user may create new products for its company by inserting reference, description, unit and price (601);

4.2) Delete product (602)—The user may delete products if he/she has permission to do so (602).

4.3) Edit product (609)—Enables the data of a given product (601) to be altered;

4.4) Search product (603)—It is possible to look for a given product by introducing the search text in the field "Search" (603);

4.5) Add product to the consultation (604)—Products can be added to the consultation by using the icon "+" in the list of products existing in the database to the left of the screen (604);

4.6) Withdraw product from the consultation (605)—Products can be withdrawn from the consultation by using the icon "delete" in the list of products existing in the consultation to the right of the screen (605);

4.7) Alter required quantity (606)—The user should introduce the desired quantity for each product of the consultation (606);

4.8) Export products (607)—Exports the total list of existing products for the user's company in Microsoft Excel (xlsx) format (607);

4.9) Import products (608)—The user may, if he/she so wishes, import the list of products from an Excel file. To do so, he/she must choose the option import files and choose the location on his/her computer of the Excel file containing this information. In so doing, he/she can choose the start and the end of the lines of data to be imported from the Excel file, and also specify what each column represents (reference, description, unit and price). The user may also decide whether or not the existing product data should be deleted prior to importing (608).

7) Suppliers

Figure 7:
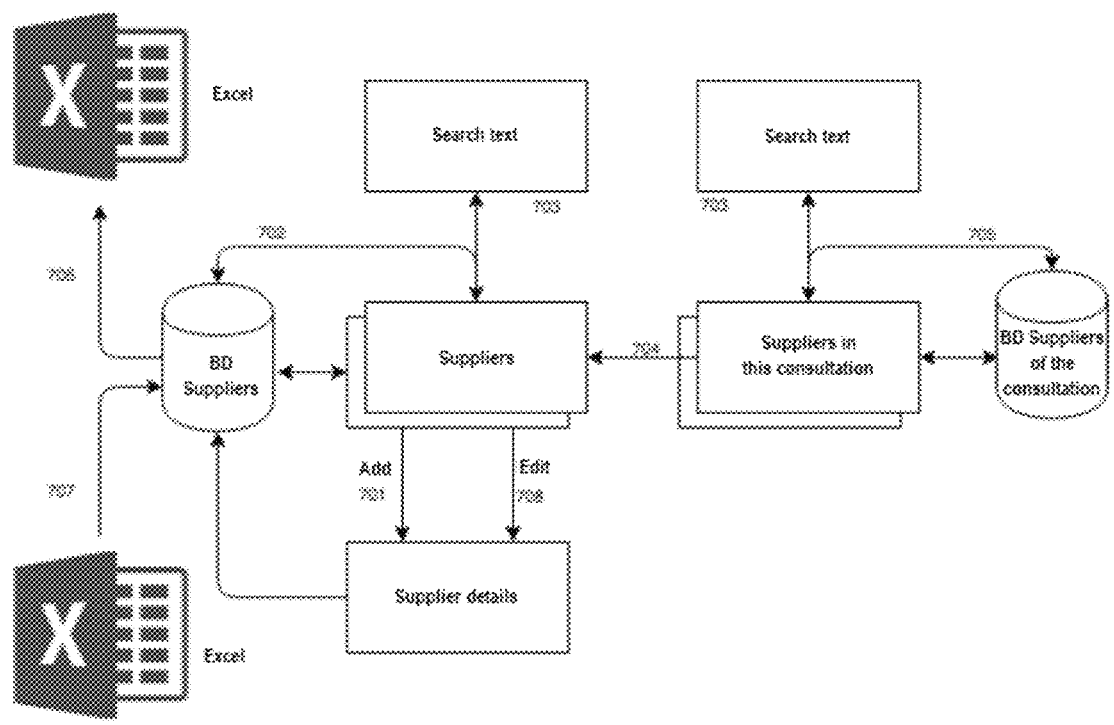
FIG. 7 is a detailed diagram of creating, editing and importing from suppliers and including them in a given consultation.

FIG. 7 is a detailed diagram of creating, editing and importing suppliers and inclusion thereof in a given consultation. This option has the following functionalities:

5.1) Create supplier (701)—The user may create new suppliers for its company by inserting the respective references and name (701).

5.2) Delete supplier (702)—The user may delete suppliers if he/she has permission to do so (702).

5.3) Edit supplier (708)—Enables the data of a given supplier (708) to be altered.

5.4) Search supplier (703)—It is possible to look for a given supplier by introducing the search text in the field "Search" (703).

5.5) Add supplier to the consultation (704)—Suppliers can be added to the consultation by using the icon "+" in the list of existing suppliers on the database to the left of the screen (704).

5.6) Withdraw supplier of the consultation (705)—Suppliers can be withdrawn from the consultation by using the icon "delete" in the list of existing suppliers in the consultation to the right of the screen (705).

5.7) Export suppliers (706)—Exports the total list of existing suppliers for the user's company in Microsoft Excel (xlsx) format (706).

5.8) Import suppliers (707)—The user may, if he/she so wishes, import the list of suppliers from an Excel file. To do so, he/she should choose the option import files and choose the location on his/her computer of the Excel file containing this information. In so doing, he/she can choose the start and end of the lines of data to be imported from the Excel file and also specify what each column represents (reference, name, e-mail, fax and telephone). The user may also decide whether or not the data of the existing suppliers should be deleted prior to importing (707).

8) Validation

Figure 8:
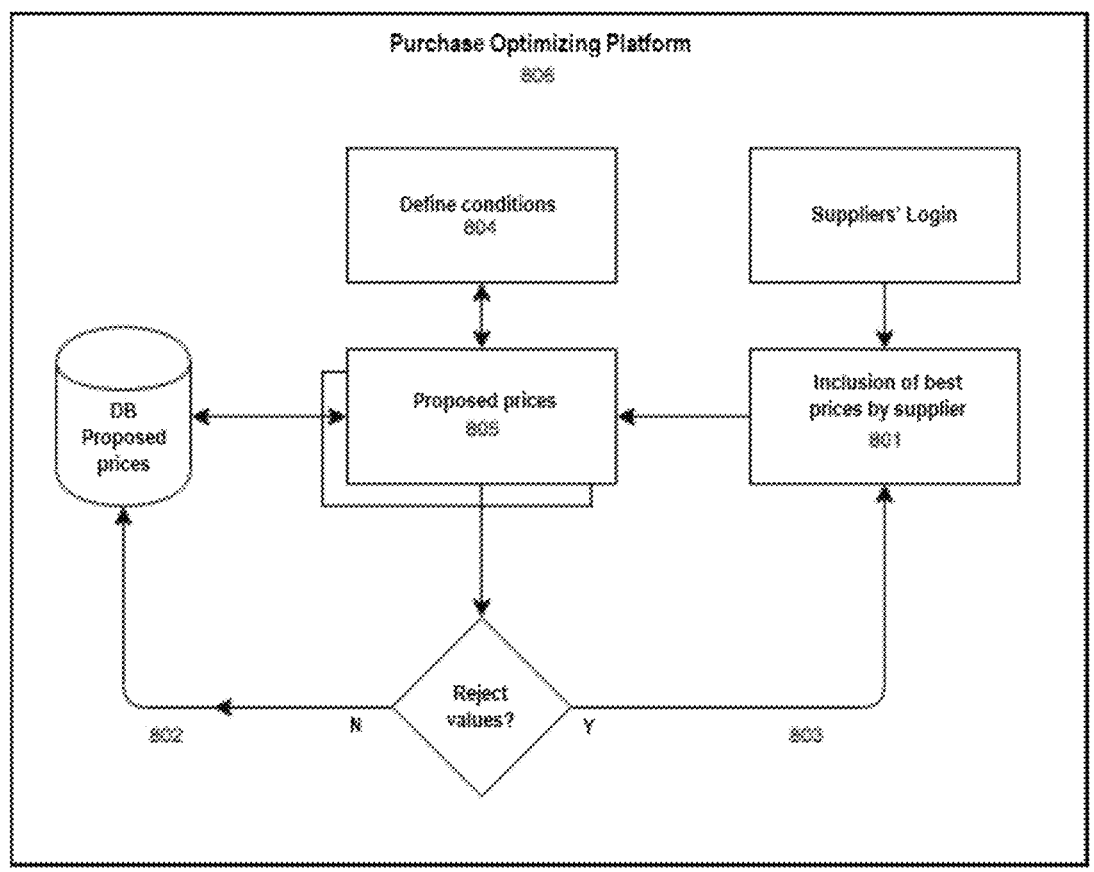
FIG. 8 is a detailed diagram of the process of including quantities, prices and discounts by the supplier and the validation thereof by the purchase centre.

FIG. 8 is a detailed diagram of the process of including the quantities, prices and discounts by the supplier and the validation thereof by the purchase centre. This option has the following functionalities:

6.1) After completing (801), within the term established by the Purchase Centre, the proposals to furnish by the suppliers (805) in terms of unit price, maximum quantity proposed for each product and any incremental discounts on quantity or total purchase value, as well as financial discounts, the company or purchase centre proceeds to the initial evaluation of all the proposals admitted by way of the purchase optimizing platform (806).

6.2) The receipt of the proposals presented by the suppliers does not commit the Purchase Centre to any procurement nor do they limit their right to negotiate in defence of their best interests.

6.3) During the initial evaluation of the proposals, the Purchase Centre may reject (803) any of the suppliers or part of the products they proposed to furnish and/or admit a given supplier or suppliers to furnish part of the quantities of the products which it/they proposed, establishing a minimum percentage to be acquired of the proposed quantities of the products by the respective suppliers (804).

6.4) If the sum of the admitted supply quantities of any product is higher than the quantity required, a message will appear informing the purchase centre that it should review the supply validation conditions because the problem does not have an admissible solution.

6.5) If the sum of the proposed supply quantities of any product is less than the quantity required, a message will appear informing the purchase centre that it should adjust the quantity required in accordance with the supply capacity of the respective product.

9) Optimizing

Figure 9:
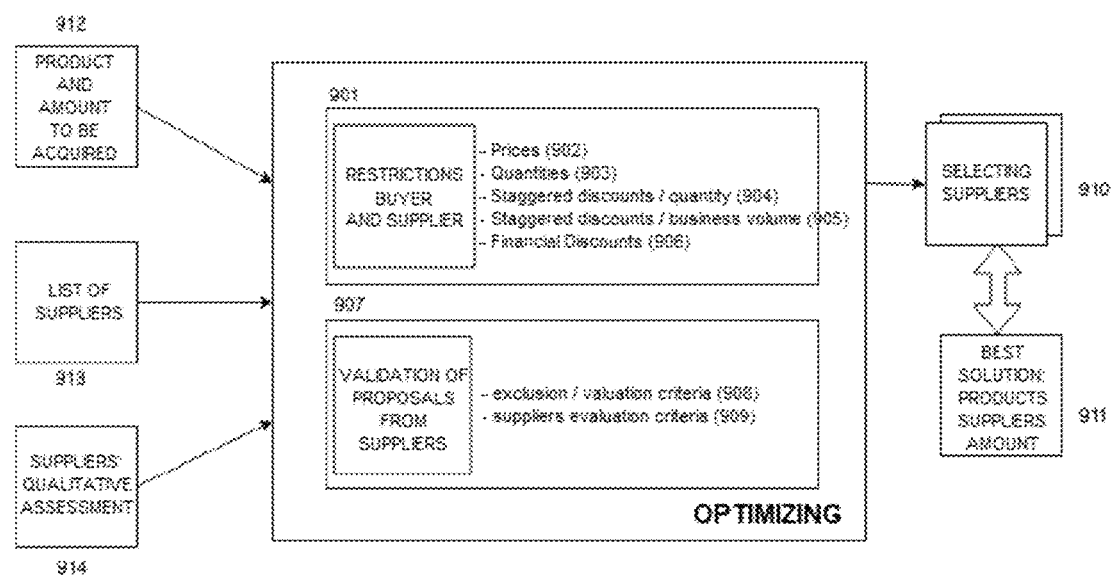
FIG. 9 is a detailed diagram of the process of mathematical optimizing of purchases.

FIG. 9 is a detailed diagram of the process of mathematical optimizing of purchases.

The computer-implemented invention described in the present invention comprises the use a linear optimization algorithm which uses approximations of linear parts of mixed integer programming functions with continuous and integer variables subject to a considerable number of constraints, that presents a very high number, in most cases, of possible solutions (with 10 products and 5 suppliers, there are at least 9,765,625 possible solutions), to determine very quickly, the optimal combination of quantities of multiple products to contract out to multiple suppliers, so as to minimise the total acquisition cost.

The purchaser or authorised user of a purchase centre identifies the products and the quantities to be acquired (912) and proceeds to consult potential suppliers (913) over the digital purchase platform.

The suppliers are previously evaluated according to qualitative criteria (914) before knowing their supply proposals in terms of prices, quantities and any discount premiums.

The optimal solution (911) to the problem can attribute to one or more suppliers (910) the provision of a part of the quantities of the product it/they proposed to furnish, bearing in mind, exclusively, the minimum acquisition cost subject to multiple functional restrictions (901) on prices (902), required and proposed quantities (903), staggered discounts on quantity (904), staggered discounts on total purchase value (905), financial discounts (906), exclusion/valuation of products and/or suppliers (908) and other qualitative evaluation criteria of suppliers (909).

For example: let use suppose that a purchaser consults two potential suppliers (F1 and F2) for the provision of 100 and 50 units of the products P1 and P2, respectively. The suppliers F1 and F2 decide to present the same conditions in terms of unit prices (6.25€ for P1 and 17.50€ for P2) and proposed quantities (100 for P1 and 50 for P2).

However, supplier F1 presents staggered discounts for specific quantities of the products P1 (6.5% if purchasing at least 25 units, 9% if purchasing at least 50 units and 12% if purchasing at least 75 units) and P2 (4% if purchasing at least 20 units and 6% if purchasing at least 30 units), as well as a financial discount for immediate payment or up to 30 days at 10.5%.

In turn, supplier F2 offers staggered discounts on total purchase value (5% if the purchase value is higher than 500€, 8.5% if it exceeds 750.00€ and 13.5% if over 1050.00€), in addition to a financial discount for prompt payment or up to 30 days at 5.5%.

The possible combinations of the procurement of the required quantities of the products P1 and P2 from a single supplier (F1 or F2) lead to the solutions: 1228.39€ (100 units from P1 and 50 units from P2 to F1), 1226.14€ (100 units from P1 and 50 units from P2 to F2), 1248.84€ (100 units from P1 to F1 and 50 units from P2 to F2) and 1297.23€ (100 units from P1 to F2 and 50 units from P2 to F1). However, none of the prior purchase options is the optimal purchase solution. If there are no other criteria for evaluating products and/or suppliers, the optimal purchase choice consists of purchasing 72 units of P1 to F1, 28 units of P1 to F2 and 50 units of P2 to F2, which leads to the minimum cost of 1224.80€.

The computer-implemented purchase optimizing and negotiation algorithm referred to in the present invention provides an answer to this and other problems without imposing any restriction on the number of products and/or suppliers.

The company or Purchase centre may adopt an optimal selection procedure of the best supply proposals according to qualitative evaluation criteria or scores (909) of the suppliers in addition to the price and any discounts offered by suppliers.

The criteria such as the efficacy of the delivery terms, the quality of the service rendered, the levels of technical assistance, the corporate financial stability, the geographical location, among others, may be considered in the decision on optimal purchase choice, partially or totally relaxing the function of the economically most advantageous proposal in favour of evaluation criteria that best satisfy the purchaser's interests.

In this process, the purchaser previously establishes the weights to be given to each of the choice parameters of the suppliers, subsequently attributing the scores to the respective criteria, except price, which enables an initial or preliminary ranking of suppliers to be established for each of the products included in their supply proposals.

Thereafter, the purchaser determines the optimal procurement solution in direct proportion to said evaluation criteria of the suppliers, including price and any discount premiums, considering the cost function and the multiple restrictions on the purchaser and on the suppliers (901) and other evaluation criteria (907) in accordance with the respective scores, by way of the mathematical straight-line optimizing algorithm.

10) Report

Figure 10:
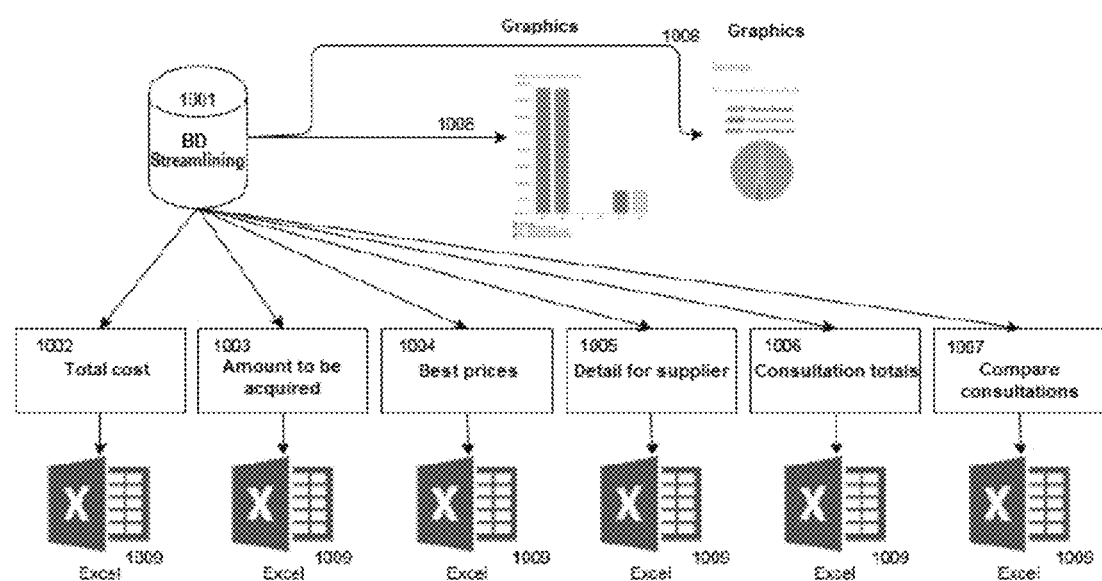
FIG. 10 is a detailed diagram of the dynamic reports produced in real time based on the optimal solution generated by the purchase platform.

FIG. 10 is a detailed diagram of the dynamic reports produced in real time based on the optimal solution generated by the purchase platform. This option comprises the following functionalities:

8.1) The purchase optimizing method produces detailed information (1001) on the total procurement (1002), the optimal quantities to be acquired per product, best prices proposed per product, products and optimal quantities to be acquired per supplier, summary of the optimal purchase per consultation, comparison of subconsultations in table and graph forms.

8.2) In the table of the optimal quantities to be acquired per product (1003) is the identifier of the product, the designation of the product, the identifier of the product supplier, the designation of the product supplier, the proposed price of the product, the optimal quantity to be acquired of the product, the initial cost of the product, the discount of the product in value and the difference between the initial cost and the discount of the product.

8.3) In the table of the best prices proposed per product (1004) is the listing of the best unit prices of each of the products or lot of products that are the object of pricing.

8.4) In the table of the products and optimal quantities per supplier (1005) is the listing of each of the suppliers selected with the products or lot of procured products and the conditions contracted in terms of unit prices, optimal quantities to contract out and any discounts per product or per overall volume of the contracted deal and financial discounts.

8.5) In the table of the summary of the optimal purchase per consultation (1006) is the listing of the prices and optimal quantities of the products or lots of products to be acquired and respective suppliers as well as the procurement conditions (product discounts or per overall business volume and financial discounts).

8.6) In the table of the comparison of subconsultations (1007) is a list of the supply proposals in terms of discounts per product, discounts per overall business volume, financial discounts, initial costs, optimal costs and savings.

8.7) In the graphics of the comparison of consultations (1008) are bar graphs with the initial costs, the optimal costs and the savings obtained for each of the subconsultations and pizza graphs with the distribution of the savings in terms of product discounts, discounts on business volume and financial discounts. All these reports can be exported to Excel (1009) format.

Advantages of the Invention

The use of the digital method of centralising, optimizing and monitoring purchases described in the invention provides six core advantages:

1) Economical—Reduction in the acquisition cost of the goods and services, the administrative costs of the processes and personnel costs;

2) Strategic—Enhanced efficacy and efficiency in the processing of selecting the products and services, based on the centralizing negotiations and optimizing business procedures, enabling improved risk management;

3) Organisational—Reinforced centralisation of the purchase function, benefiting from economies of scale by the acquisition and overall management of goods and services, enabling a more specialized human resource structure to be achieved;

4) Procedural—Improved efficacy by introducing standardised processes in accordance with the best practices, stock control, reduction in the sourcing cycle time;

5) Technological—Automation of the purchase function by way of an integrated, computer-supported method of science-based optimizing, providing the information and reporting tools in real time;

6) Competitive—Highly configurable and customizable solution enabling the total acquisition cost to be minimised, imposing a countless multitude of functional restrictions of a commercial, financial, organisational and logistical nature that best defends the interests of the purchase centre.

The present invention should only be limited by the spirit of the accompanying claims.

The invention claimed is:

1. A digital method of centralizing, optimizing and negotiating a purchase of goods and services between companies (business-to-business, B2B), implemented by a computer comprising:
   a) consultation with one or more suppliers (103) potentially interested in supplying one or more products (102) to be acquired by a user (101) authorised by one buyer, wherein the buyer is a company or purchase centre (108), through a digital purchase platform (109), hosted in a dedicated server, locally or in a cloud;
   b) completion of proposals (104) by interested suppliers (103) to supply said one or more products (102) or alternative products (102) in terms of unit prices, maximum quantities of products (102) that the interested suppliers (103) propose to supply, staggered discounts for specific quantities of the one or more products (102), staggered discounts on total purchase value and other commercial or financial discounts, using unique credentials provided by the company or purchase centre (108) to access the digital purchase platform (109);
   c) validation of conditions proposed by said interested suppliers (103) by the company or purchase centre (108) through the digital purchase platform (109), wherein said company or purchase centre (108) accepts or rejects the supply proposal (104) of any of the interested suppliers (103) or part of the proposal (104) of any of the interested suppliers (103), wherein the company or purchase centre (108) fixes a minimum percentage of the proposed quantities of products (102) to be acquired from the respective interested suppliers (103) based on supplier evaluation criteria (ratings);
   d) determination, in real time, of an optimal combination of quantities of multiple products (102) to contract out to multiple suppliers (103), to minimize the total cost of the purchase of products (102), using a mathematical linear optimization algorithm to determine the optimal product-supplier combination, which uses approximations of linear parts of mixed integer programming functions with continuous and integer variables, subject to multiple commercial, financial, price and quantity restrictions and other valuations or exclusions of products (102) and suppliers (103) that satisfy interests of the company or purchase centre (108);

e) after finding an optimal purchase combination from an initial consultation of products (102), the interested suppliers (103) are invited through a subconsultation of negotiation to improve on initial proposals through the digital platform (109) in terms of unit prices, commercial discounts and financial discounts, in cases where they have not done so in the initial proposal (104) or intend to improve conditions where they have not done, wherein the interested suppliers (103) also present prices and any discounts for new products (102) and/or alternative products (102) to the products (102) launched in subconsultations consisting of optimizations of the process of negotiation and purchase of products (102), resulting in the lowest possible cost;

f) validation of reviewed proposals (104) from the interested suppliers (103), contained in said subconsultations, through the digital purchase platform (109), wherein the company or purchase centre (108) create in real time different scenarios of economically advantageous proposals (104) that satisfy all the restrictions imposed by the purchasers (110) and interested suppliers (103);

g) creation of tables (106) and reports in real time with detailed information on each of the different scenarios of potential purchases through the digital purchase platform (109), specifically referring to optimal quantities to be contracted out per product (102) to each interested supplier (103), best prices proposed (104) for each product (102), commercial discounts on quantity or purchase value, financial discounts, initial costs, optimal costs and savings obtained per interested supplier (103) and per consultation or subconsultation (105), this is achieved through charts, tables (106), dynamic graphics (107) and comparative analyses;

h) contract out through the digital purchase platform (109) the proposals (104) that satisfy the interests of the company or purchase centre (108), informing selected suppliers (103) of the one or more products (102) and quantities they will supply as well as conditions agreed upon in terms of discounts on quantity or total purchase value and financial discounts;

wherein the digital purchase platform (109) has program instructions configured to execute the steps consisting of steps (a) to (h).

2. A digital system of centralizing, optimizing and negotiating purchases comprising:

at least one computer;
a company or purchase centre (108);
a dedicated server, locally or in a cloud; and
a digital purchase platform (109) in communication with the computer and the dedicated server, wherein the digital purchase platform has program instructions executable by the at least one computer to:

a) consult with one or more suppliers (103) potentially interested in supplying one or more products (102) to be acquired by a user (101) authorised by one buyer, wherein the buyer is a company or purchase centre (108), through a digital purchase platform (109), hosted in a dedicated server, locally or in a cloud;

b) complete of proposals (104) by interested suppliers (103) to supply said one or more products (102) or alternative products (102) in terms of unit prices, maximum quantities of products (102) that the interested suppliers (103) propose to supply, staggered discounts for specific quantities of the one or more products (102), staggered discounts on total purchase value and other commercial or financial discounts, using unique credentials provided by the company or purchase centre (108) to access the digital purchase platform (109);

c) validate of conditions proposed by said interested suppliers (103) by the company or purchase centre (108) through the digital purchase platform (109), wherein said company or purchase centre (108) accepts or rejects the supply proposal (104) of any of the interested suppliers (103) or part of the proposal (104) of any of the interested suppliers (103), wherein the company or purchase centre (108) fixes a minimum percentage of the proposed quantities of products (102) to be acquired from the respective interested suppliers (103) based on supplier evaluation criteria (ratings);

d) determine, in real time, of an optimal combination of quantities of multiple products (102) to contract out to multiple suppliers (103), to minimize the total cost of the purchase of products (102), using a mathematical linear optimization algorithm to determine the optimal product-supplier combination, which uses approximations of linear parts of mixed integer programming functions with continuous and integer variables, subject to multiple commercial, financial, price and quantity restrictions and other valuations or exclusions of products (102) and suppliers (103) that satisfy interests of the company or purchase centre (108);

e) after finding an optimal purchase combination from an initial consultation of products (102), invite the interested suppliers (103) through a subconsultation of negotiation to improve on initial proposals through the digital platform (109) in terms of unit prices, commercial discounts and financial discounts, in cases where they have not done so in the initial proposal (104) or intend to improve conditions where they have not done, wherein the interested suppliers (103) also present prices and any discounts for new products (102) and/or alternative products (102) to the products (102) launched in subconsultations consisting of optimizations of the process of negotiation and purchase of products (102), resulting in the lowest possible cost;

f) validate of reviewed proposals (104) from the interested suppliers (103), contained in said subconsultations, through the digital purchase platform (109), wherein the company or purchase centre (108) create in real time different scenarios of economically advantageous proposals (104) that satisfy all the restrictions imposed by the purchasers (110) and interested suppliers (103);

g) create tables (106) and reports in real time with detailed information on each of the different scenarios of potential purchases through the digital purchase platform (109), specifically referring to optimal quantities to be contracted out per product (102) to each interested supplier (103), best prices proposed (104) for each product (102), commercial discounts on quantity or purchase value, financial discounts, initial costs, optimal costs and savings obtained per interested supplier (103) and per consultation or subconsultation (105), this is achieved through charts, tables (106), dynamic graphics (107) and comparative analyses;

h) contract out through the digital purchase platform (109) the proposals (104) that satisfy the interests of the company or purchase centre (108), informing selected suppliers (103) of the one or more products (102) and quantities they will supply as well as conditions agreed upon in terms of discounts on quantity or total purchase value and financial discounts;

wherein the digital purchase platform (109) has program instructions configured to execute the steps consisting of steps (a) to (h).

3. A non-transitory computer program product having stored thereon program instructions, the program instructions executable by at least one computer to:

a) consult with one or more suppliers (103) potentially interested in supplying one or more products (102) to be acquired by a user (101) authorised by one buyer, wherein the buyer is a company or purchase centre (108), through a digital purchase platform (109), hosted in a dedicated server, locally or in a cloud;

b) complete of proposals (104) by interested suppliers (103) to supply said one or more products (102) or alternative products (102) in terms of unit prices, maximum quantities of products (102) that the interested suppliers (103) propose to supply, staggered discounts for specific quantities of the one or more products (102), staggered discounts on total purchase value and other commercial or financial discounts, using unique credentials provided by the company or purchase centre (108) to access the digital purchase platform (109);

c) validate of conditions proposed by said interested suppliers (103) by the company or purchase centre (108) through the digital purchase platform (109), wherein said company or purchase centre (108) accepts or rejects the supply proposal (104) of any of the interested suppliers (103) or part of the proposal (104) of any of the interested suppliers (103), wherein the company or purchase centre (108) fixes a minimum percentage of the proposed quantities of products (102) to be acquired from the respective interested suppliers (103) based on supplier evaluation criteria (ratings);

d) determine, in real time, of an optimal combination of quantities of multiple products (102) to contract out to multiple suppliers (103), to minimize the total cost of the purchase of products (102), using a mathematical linear optimization algorithm to determine the optimal product-supplier combination, which uses approximations of linear parts of mixed integer programming functions with continuous and integer variables, subject to multiple commercial, financial, price and quantity restrictions and other valuations or exclusions of products (102) and suppliers (103) that satisfy interests of the company or purchase centre (108);

e) after finding an optimal purchase combination from an initial consultation of products (102), invite the interested suppliers (103) through a subconsultation of negotiation to improve on initial proposals through the digital platform (109) in terms of unit prices, commercial discounts and financial discounts, in cases where they have not done so in the initial proposal (104) or intend to improve conditions where they have not done, wherein the interested suppliers (103) also present prices and any discounts for new products (102) and/or alternative products (102) to the products (102) launched in subconsultations consisting of optimizations of the process of negotiation and purchase of products (102), resulting in the lowest possible cost;

f) validate of reviewed proposals (104) from the interested suppliers (103), contained in said subconsultations, through the digital purchase platform (109), wherein the company or purchase centre (108) create in real time different scenarios of economically advantageous proposals (104) that satisfy all the restrictions imposed by the purchasers (110) and interested suppliers (103);

g) create tables (106) and reports in real time with detailed information on each of the different scenarios of potential purchases through the digital purchase platform (109), specifically referring to optimal quantities to be contracted out per product (102) to each interested supplier (103), best prices proposed (104) for each product (102), commercial discounts on quantity or purchase value, financial discounts, initial costs, optimal costs and savings obtained per interested supplier (103) and per consultation or subconsultation (105), this is achieved through charts, tables (106), dynamic graphics (107) and comparative analyses;

h) contract out through the digital purchase platform (109) the proposals (104) that satisfy the interests of the company or purchase centre (108), informing selected suppliers (103) of the one or more products (102) and quantities they will supply as well as conditions agreed upon in terms of discounts on quantity or total purchase value and financial discounts;

wherein the digital purchase platform (109) has program instructions configured to execute the steps consisting of steps (a) to (h).

* * * * *